(12) United States Patent
Bhattacharjee et al.

(10) Patent No.: US 7,986,661 B2
(45) Date of Patent: Jul. 26, 2011

(54) EFFICIENT UTILIZATION OF TRANSMISSION GAPS FOR CELL MEASUREMENTS

(75) Inventors: Supratik Bhattacharjee, San Diego, CA (US); Messay Amerga, San Diego, CA (US); Brian Dong, San Diego, CA (US); Gurdeep Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1015 days.

(21) Appl. No.: 11/367,498

(22) Filed: Mar. 2, 2006

(65) Prior Publication Data
US 2007/0207824 A1 Sep. 6, 2007

(51) Int. Cl.
*H04W 4/00* (2009.01)
(52) U.S. Cl. ......... 370/329; 370/278; 370/252; 370/528
(58) Field of Classification Search .................. 455/436; 370/278, 329, 252, 528
See application file for complete search history.

(56) References Cited

U.S. PATENT DOCUMENTS

| | | | | |
|---|---|---|---|---|
| 7,471,655 | B2 * | 12/2008 | Gallagher et al. | 370/329 |
| 2004/0156324 | A1 * | 8/2004 | Steudle | 370/278 |
| 2009/0022062 | A1 * | 1/2009 | Wang et al. | 370/252 |
| 2009/0042559 | A1 * | 2/2009 | Choi | 455/423 |

FOREIGN PATENT DOCUMENTS

| | | |
|---|---|---|
| EP | 1377102 | 1/2004 |
| WO | 99009772 | 2/1999 |

OTHER PUBLICATIONS

International Search Report—PCT/US07/063227—ISA/EPO-Sep. 10, 2007.
Written Opinion—PCT/US07/063227—ISA/EPO—Sep. 10, 2007.
"Universal Mobile Telecommunications System (UMTS)", ETSI Standards, European Telecommuincations Standards Institute, SOPHIA-ANTIPO, FR, vol. 3-R4, No. V720, Dec. 2005.

* cited by examiner

*Primary Examiner* — Wayne Cai
(74) *Attorney, Agent, or Firm* — Howard H. Seo; Kristine U. Ekwueme

(57) ABSTRACT

A terminal communicates with a first wireless network and obtains a list of cells in a second wireless network to measure. The terminal operates in a compressed mode and receives multiple transmission gap pattern sequences for different measurement purposes, e.g., RSSI measurements, BSIC identification, and BSIC re-confirmation. The terminal utilizes each transmission gap for its designated purpose or an alternate purpose. For each transmission gap, the designated purpose for the transmission gap is ascertained, and whether the transmission gap is usable for an alternate purpose is also determined based on at least one criterion. The transmission gap is used for the alternate purpose if the at least one criterion is satisfied and is used for the designated purpose otherwise. For example, a transmission gap designated for RSSI measurement may be used for BSIC identification, a transmission gap designed for BSIC identification or BSIC re-confirmation may be used for RSSI measurement, and so on.

30 Claims, 12 Drawing Sheets

EFFICIENT UTILIZATION OF TRANSMISSION GAPS FOR CELL MEASUREMENTS

BACKGROUND

I. Field

The present disclosure relates generally to communication, and more specifically to cell measurements in asynchronous communication networks.

II. Background

Wireless communication networks are widely deployed to provide various communication services such as voice, packet data, broadcast, messaging, and so on. These wireless networks may be capable of supporting communication for multiple users by sharing the available network resources. Examples of such wireless networks include Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), and so on, which are known in the art.

A terminal (e.g., a cellular phone) may be capable of communicating with multiple wireless networks such as a Universal Mobile Telecommunication System (UMTS) network that implements W-CDMA and a GSM network. Each wireless network typically includes many cells, where the term "cell" can refer to a base station or the coverage area of the base station, depending on the context in which the term is used. The terminal typically communicates with a serving cell in only one wireless network at any given moment but may periodically make measurements for cells in the other wireless network. The cell measurements may include measurements for received signal strength, frequency, timing, and identity of the cells. The cell measurements allow the terminal to ascertain whether any cell in the other wireless network is better than the current serving cell. If a better cell is found in the other wireless network, then the terminal may switch to the other wireless network and receive service from the better cell.

It is desirable to make the cell measurements as quickly and efficiently as possible. For example, the terminal may be mobile and may have moved outside the coverage of the serving wireless network. By completing the cell measurements and reporting the better cells sooner, the terminal may be handed off to a better cell before the call is dropped. However, the GSM and UMTS networks may operate asynchronously so that the timing of the cells in the GSM network cannot be ascertained based on the timing of the cells in the UMTS network, and vice versa. Furthermore, the cells in each network may operate asynchronously of one another. The asynchronous operation at the network and cell levels complicates cell measurements.

There is therefore a need in the art for techniques to efficiently make cell measurements in asynchronous communication networks.

SUMMARY

Techniques for efficiently utilizing transmission gaps to make cell measurements in asynchronous communication networks, e.g., GSM and UMTS networks, are described herein. A terminal communicates with one wireless network (e.g., the UMTS network) and obtains a list of cells in another wireless network (e.g., the GSM network) to measure. The terminal operates in a compressed mode and receives multiple transmission gap pattern sequences for different measurement purposes. For example, the terminal may obtain (1) a transmission gap pattern sequence for making received signal strength indicator (RSSI) measurements for the cells in the list, which is called GAP1, (2) a transmission gap pattern sequence for performing base transceiver station identity code (BSIC) identification to identify the cells that have been measured, which is called GAP2, and (3) a transmission gap pattern sequence for performing BSIC reconfirmation to reconfirm the cells that have been identified, which is called GAP3. Each transmission gap pattern sequence contains gaps in transmission (or transmission gaps) that may be used for cell measurements.

The terminal may utilize each transmission gap for its designated purpose or for an alternate purpose. For each transmission gap, the designated purpose for the transmission gap is ascertained. Whether the transmission gap is usable for an alternate purpose is also determined based on at least one criterion. The transmission gap is used for the alternate purpose if the at least one criterion is satisfied and is used for the designated purpose otherwise.

The designated purpose for a transmission gap may be BSIC identification or BSIC re-confirmation, and the transmission gap may be used for RSSI measurement, e.g., if the first RSSI scan has not been completed and no cells are available for identification. The designated purpose may be BSIC re-confirmation, and the transmission gap may be used for BSIC identification, e.g., if no cells have been identified or if the transmission gap is not usable for re-confirmation of any identified cell. The designated purpose may be RSSI measurement, and the transmission gap may be used for BSIC identification, e.g., if no cells have been identified and/or if RSSI measurements have been made for at least one new cell. The designated purpose may be BSIC identification, and the transmission gap may be used for BSIC re-confirmation, e.g., if an identified cell is sufficiently strong, has not been reconfirmed within a particular time period, and can be reconfirmed with the transmission gap. In general, a transmission gap may be used for an alternate purpose based on any criteria.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The cell measurement techniques described herein may be used for various asynchronous communication networks. For clarity, these techniques are specifically described below for GSM and UMTS networks.

Figure 1:
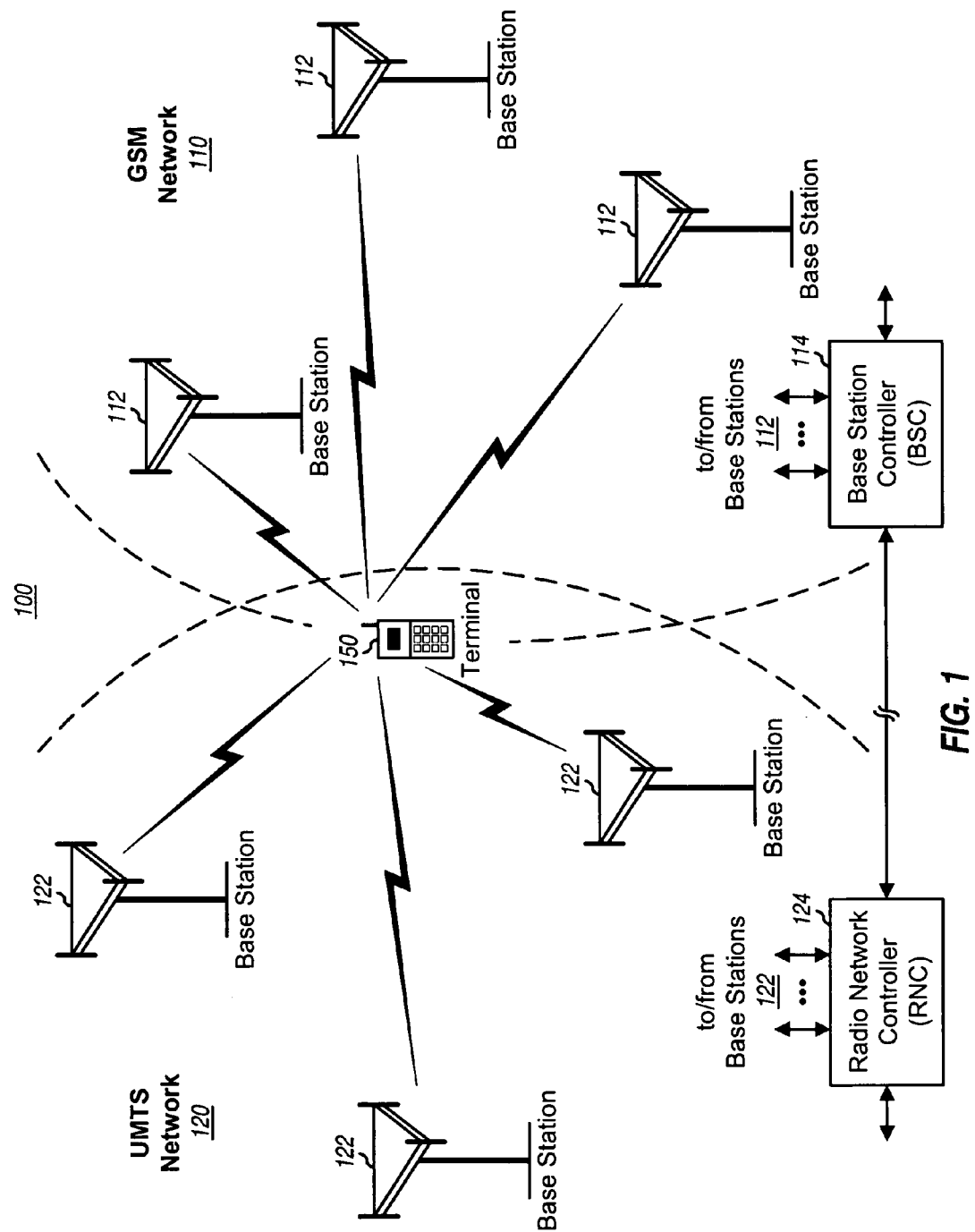
FIG. 1 shows a GSM network and a UMTS network.

FIG. 1 shows a public land mobile network (PLMN) 100 that includes a GSM network 110 and a UMTS network 120. The terms "network" and "system" are often used interchangeably. GSM is a radio technology that can provide voice service and low to medium rate packet data service. GSM networks are widely deployed throughout the world. W-CDMA is a new radio technology that can provide enhanced services and capabilities, e.g., higher data rates, concurrent voice and data calls, and so on. UMTS network 120 implements W-CDMA and is also called a UMTS Terrestrial Radio Access Network (UTRAN). The terms "UMTS" and "W-CDMA" are used interchangeably in the following description. GSM network 110 and UMTS network 120 are two wireless networks employing different radio technologies (GSM and W-CDMA) but belonging to the same service provider or network operator. GSM and UMTS are described in documents from a consortium named "3rd Generation Partnership Project" (3GPP), which are publicly available.

GSM network 110 includes base stations 112 that communicate with terminals within the coverage area of the GSM network. A base station is a fixed station that communicates with the terminals and may also be called a Node B, a base transceiver station (BTS), an access point, and so on. A base station controller (BSC) couples to base stations 112 and provides coordination and control for these base stations. UMTS network 120 includes base stations 122 that communicate with terminals within the coverage area of the UMTS network. A radio network controller (RNC) 124 couples to base stations 122 and provides coordination and control for these base stations. RNC 124 communicates with BSC 114 to support inter-working between the GSM and UMTS networks.

A multi-mode terminal 150 (e.g., a dual-mode cellular phone) can communicate with GSM network 110 and UMTS network 120, typically with one wireless network at any given moment. This capability allows a user to obtain the performance advantages of UMTS and the coverage benefits of GSM with the same terminal. Terminal 150 may be fixed or mobile and may also be called a user equipment (UE), a mobile station (MS), a mobile equipment (ME), and so on. Terminal 150 may be a cellular phone, a personal digital assistant (PDA), a wireless modem, a wireless communication device, a subscriber unit, and so on.

Figure 2:
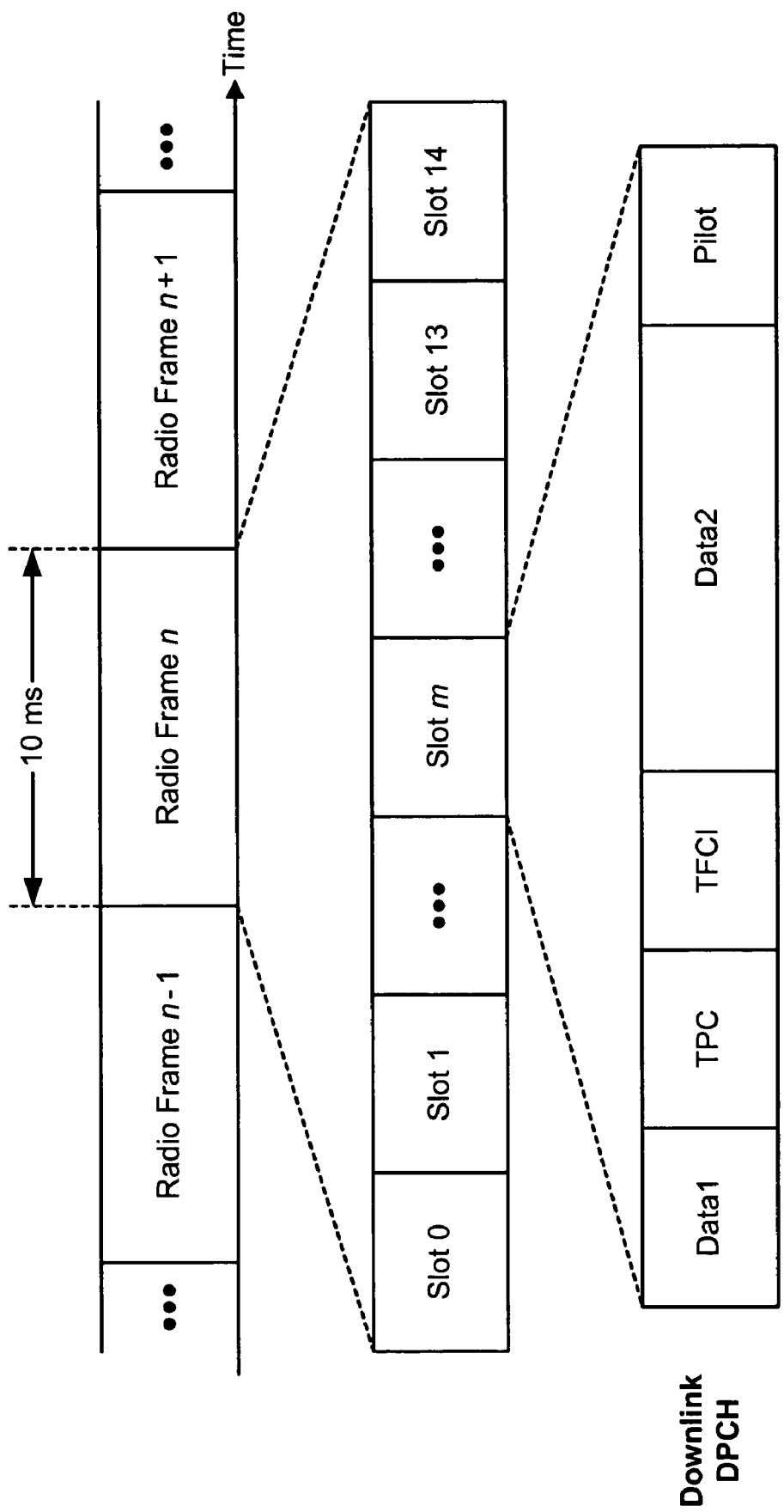
FIG. 2 shows a frame structure for the downlink in UMTS.

FIG. 2 shows a frame structure for the downlink in UMTS. This frame structure is used for a downlink dedicated physical channel (DPCH), which carries user-specific data for a terminal. The timeline for data transmission is divided into radio frames. Each radio frame is identified by a 12-bit system frame number (SFN) that is sent on a control channel. The SFN is reset to zero at a specific time, is incremented by one for each radio frame thereafter, and wraps around to zero after reaching the maximum value of 4095. Each radio frame has a duration of 10 milliseconds (ms) and is further partitioned into 15 slots, which are labeled as slot 0 through slot 14. Each slot includes two data fields (Data1 and Data2) for user-specific data, a transmit power control (TPC) field for power control information, a transport format combination indicator (TFCI) field for format information (e.g., the number of transport blocks, the transport block sizes, and so on), and a pilot field for a pilot.

Figure 3:
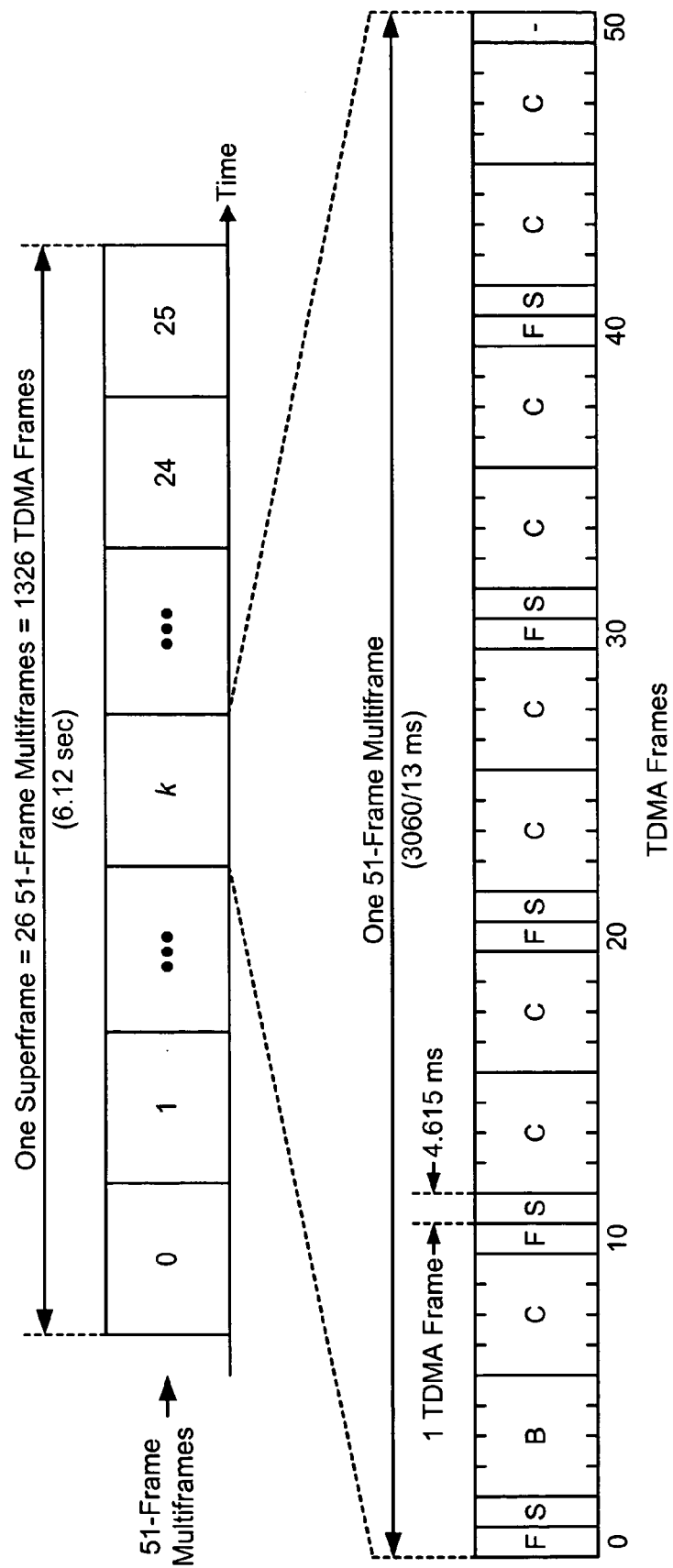
FIG. 3 shows a frame structure in GSM.

FIG. 3 shows a frame structure in GSM. The timeline for data transmission is divided into superframes. Each superframe has a duration of 6.12 seconds and includes 1326 TDMA frames. A superframe may be partitioned into either 26 51-frame multiframes (as shown in FIG. 3) or 51 26-frame multiframes. The control/overhead channels in GSM use the 51-frame multiframe structure. Each 51-frame multiframe includes 51 TDMA frames, which are labeled as TDMA frames 0 through 50. Each TDMA frame has a duration of 4.615 ms. In the following description, the TDMA frames are also referred to as GSM frames.

The control channels for GSM include a frequency correction channel (FCCH), a synchronization channel (SCH), a broadcast control channel (BCCH), and a common control channel (CCCH). The FCCH carries a tone that allows the terminals to obtain frequency and coarse timing information for the GSM cell transmitting the FCCH. The FCCH is sent in GSM frames 0, 10, 20, 30 and 40 of each 51-frame multiframe. The SCH carries (1) a reduced GSM frame number (RFN) that is used by the terminals to synchronize their timing and frame numbering and (2) a BSIC that identifies the GSM cell transmitting the SCH. The SCH is sent in GSM frames 1, 11, 21, 31 and 41 of each 51-frame multiframe. The BCCH carries system information and is sent in GSM frames 2, 3, 4 and 5 of each 51-frame multiframe. The CCCH carries control information and is also used to implement a paging channel (PCH), which carries paging messages for idle terminals. The control channels in GSM are described in a document 3GPP TS 05.01, which is publicly available.

GSM network 110 operates on one or more frequency bands. Each frequency band covers a range of frequencies and is divided into a number of 200 kHz radio frequency (RF) channels. Each RF channel is identified by a specific ARFCN (absolute radio frequency channel number). For example, the GSM 900 frequency band includes ARFCNs 1 through 124, the GSM 1800 frequency band includes ARFCNs 512 through 885, and the GSM 1900 frequency band includes ARFCNs 512 through 810.

Each GSM cell transmits traffic data and overhead data on a set of RF channels assigned to that cell by a network operator. To reduce inter-cell interference, GSM cells located near each other are assigned different sets of RF channels, so that the transmissions from these cells do not interfere one another. Each GSM cell transmits the FCCH, SCH, and BCCH on one or more of the RF channels assigned to that cell. An RF channel used to transmit these control channels is called a BCCH carrier.

Terminal 150 may communicate with UMTS network 120, e.g., for a voice call. Terminal 150 may receive from UMTS network 120 a monitored list containing up to 32 GSM neighbor cells and up to 64 UMTS neighbor cells. The monitored list may also be called a monitored set, a neighbor cell list, and so on. The monitored list indicates (1) the ARFCN of the BCCH carrier and the BSIC of each GSM neighbor cell and (2) the universal ARFCN (UARFCN) and the scrambling code of each UMTS neighbor cell. Terminal 150 makes measurements for the GSM and UMTS cells in the monitored list, as specified by 3GPP, to look for better cells.

In GSM network 110, neighboring cells transmit on different RF channels in order to avoid intra-cell interference, as noted above. Thus, in order to make measurements for GSM neighbor cells, terminal 150 may need to tune its RF receiver away from a UMTS serving cell. While tuned away, terminal 150 is not able to receive data from or transmit data to the UMTS serving cell. UMTS provides a mechanism to allow terminal 150 to make measurements for GSM cells without losing data from the UMTS network.

UMTS supports a compressed mode on the downlink. In the compressed mode, the UMTS serving cell transmits data to terminal 150 during only a portion of a radio frame, which then creates a transmission gap in the remaining portion of the radio frame. Terminal 150 can temporarily leave UMTS network 120 during the transmission gap to make measurements for GSM cells.

Figure 4:
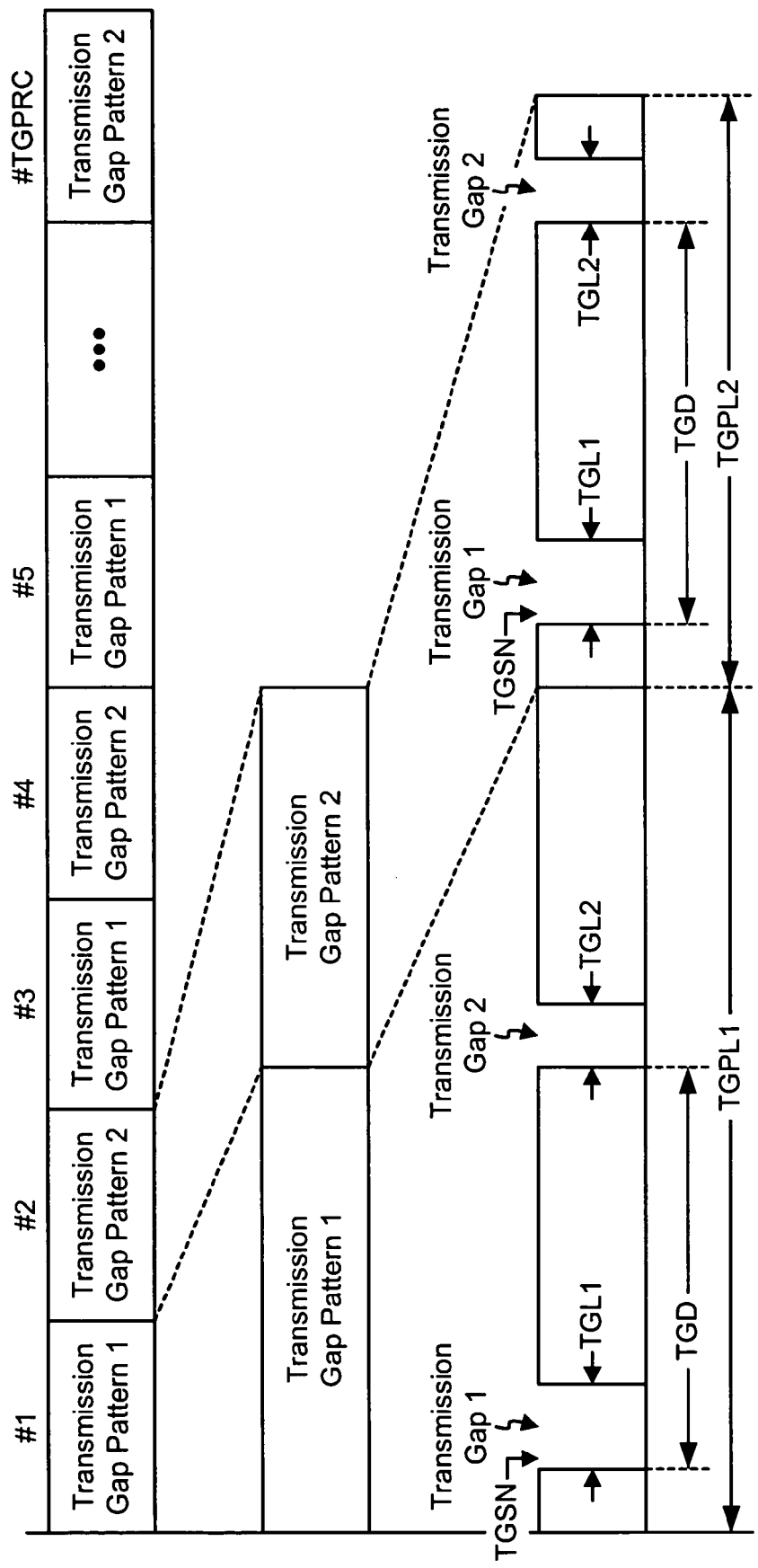
FIG. 4 shows a compressed mode transmission in UMTS.

FIG. 4 shows a compressed mode transmission in UMTS. In the compressed mode, user-specific data for terminal 150 is transmitted in accordance with a transmission gap pattern sequence, which consists of alternating transmission gap patterns 1 and 2. Each transmission gap pattern includes one or two transmission gaps. Each transmission gap may occur entirely within one radio frame or may span across two radio frames. The transmission gap pattern sequence is defined by the following parameters:

TGPRC (transmission gap pattern repetition count)—the number of transmission gap patterns within the transmission gap pattern sequence.

TGSN (transmission gap starting slot number)—the slot number of the first transmission gap slot in the transmission gap pattern (slot 1 to 14).

TGL1 (transmission gap length 1)—the duration of the first transmission gap in each transmission gap pattern (1 to 14 slots).

TGL2 (transmission gap length 2)—the duration of the second transmission gap in each transmission gap pattern (1 to 14 slots).

TGD (transmission gap distance)—the duration between the starting slots of the first and second transmission gaps (15 to 269 slots).

TGPL1 (transmission gap pattern length 1)—the duration of transmission gap pattern 1 (1 to 144 radio frames).

TGPL2 (transmission gap pattern length 2)—the duration of transmission gap pattern 2 (1 to 144 radio frames).

The compressed mode is described in documents 3GPP TS 25.212 (section 4.4), 25.213 (sections 5.2.1 and 5.2.2), and 25.215 (section 6.1), all of which are publicly available.

Figure 5:
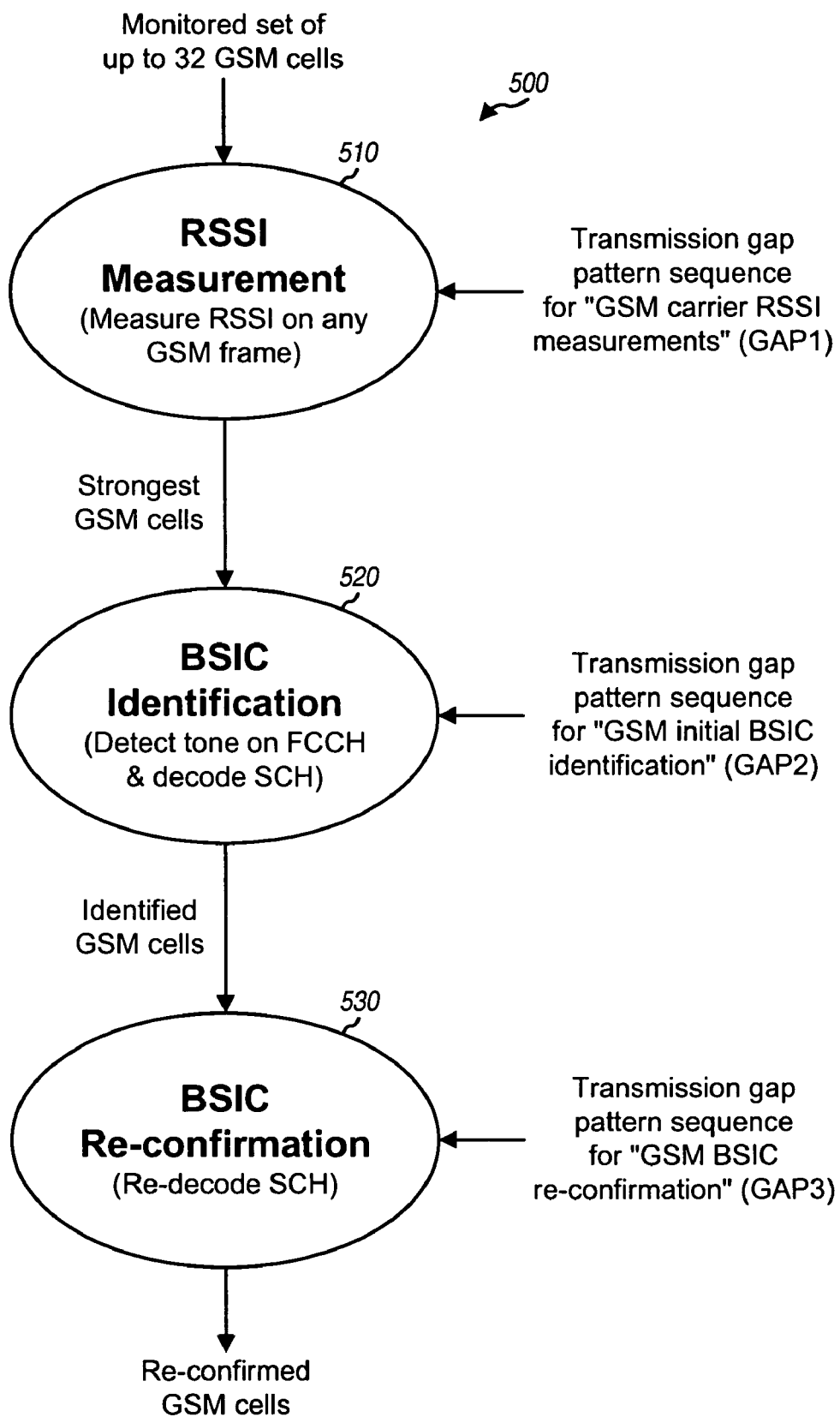
FIG. 5 shows a process for measuring GSM cells.

FIG. 5 shows an exemplary process 500 for measuring GSM cells in accordance with 3GPP TS 25.133. Terminal 150 may perform process 500, for example, during a voice call with UMTS network 120. Terminal 150 obtains from UMTS network 120 a monitored list with up to 32 GSM neighbor cells and up to 64 UMTS cells. UMTS network 120 may request terminal 150 to measure the GSM cells with BSIC verified. In this case, terminal 150 measures the received signal strength for the GSM cells in the monitored list and obtains a set of RSSI measurements for these GSM cells (block 510). The RSSI measurements may be made using a transmission gap pattern sequence with the purpose of "GSM carrier RSSI measurements", which is called GAP1 herein. The RSSI measurement in block 510 is described in detail below.

Terminal 150 sorts the GSM cells in the monitored list in descending order based on the RSSI measurements for these GSM cells. Hence, terminal 150 does not proceed to block 520 until the first RSSI scan is completed and the initial/first set of RSSI measurements has been obtained for all GSM cells in the monitored list. Terminal 150 then identifies the BSIC of up to eight strongest GSM cells, which are candidates for handover (block 520). The BSIC identification may be performed using a transmission gap pattern sequence with the purpose of "GSM initial BSIC identification", which is called GAP2 herein. The BSIC identification in block 520 is also described in detail below. Terminal 150 periodically re-confirms the BSIC of each identified GSM cell (block 530). The BSIC re-confirmation may be performed using a transmission gap pattern sequence with the purpose of "GSM BSIC reconfirmation", which is called GAP3 herein.

Figure 6:
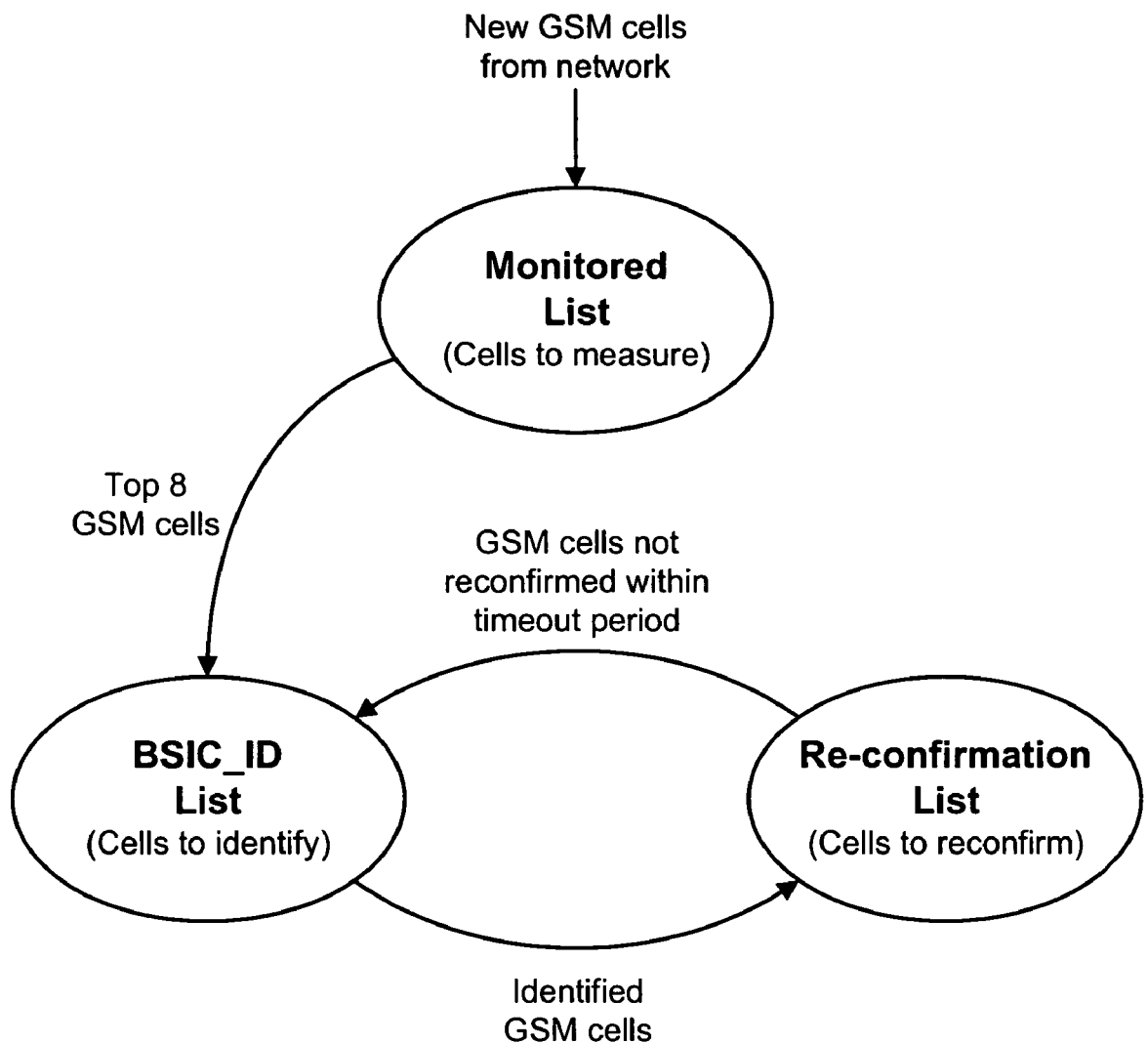
FIG. 6 shows three cell lists maintained by a terminal.

FIG. 6 shows a diagram of three cell lists that may be maintained by terminal 150. The monitored list contains up to 32 GSM neighbor cells to be measured. In each RSSI scan, terminal 150 makes RSSI measurements for all GSM cells in the monitored list and provides the top 8 GSM cells, which are the 8 strongest GSM cells received by terminal 150. A BSIC_ID list contains the top 8 GSM cells that have not been identified. Whenever a GSM cell in the BSIC_ID list is identified, that GSM cell is moved to a reconfirmation list. Each GSM cell in the re-confirmation list is periodically reconfirmed. A GSM cell that is not reconfirmed within a re-confirmation timeout period is sent back to the BSIC_ID list.

The BSIC_ID list stores the top 8 GSM cells and discards other GSM cells, if any, which are not among the top eight. A GSM cell that is not identified within an identification timeout period is sent to the bottom of the BSIC_ID list even if the RSSI measurement for this cell is stronger than the RSSI measurements for other GSM cells that have not yet faced timeout expiration. The BSIC_ID list may be considered as having two sub-lists—a non-timeout sub-list of GSM cells that have not yet faced BSIC ID timeout and a timeout sub-list of GSM cells that have faced BSIC ID timeout. The GSM cells in each sub-list are independently sorted based on their RSSI measurements. The timeout list is appended below the non-timeout list.

The three lists in FIG. 6 may be dynamically updated over time. The monitored list may be updated with new GSM cells via signaling (e.g., a Measurement Control Message (MCM) message) from the network. The BSIC_ID and re-confirmation lists may be updated as GSM cells are identified. It is desirable to have at least one good GSM cell in the re-confirmation list at any given moment in case handover to GSM is desired or necessary.

UMTS network 120 provides GAP1, GAP2 and GAP3 for the purposes of RSSI measurement, BSIC identification, and BSIC reconfirmation, respectively, if terminal 150 requires compressed mode. UMTS network 120 typically provides all three GAPs at the same time, e.g., at the start of a voice call. UMTS network 120 may define GAP1, GAP2 and GAP3 in various manners.

Figure 7:
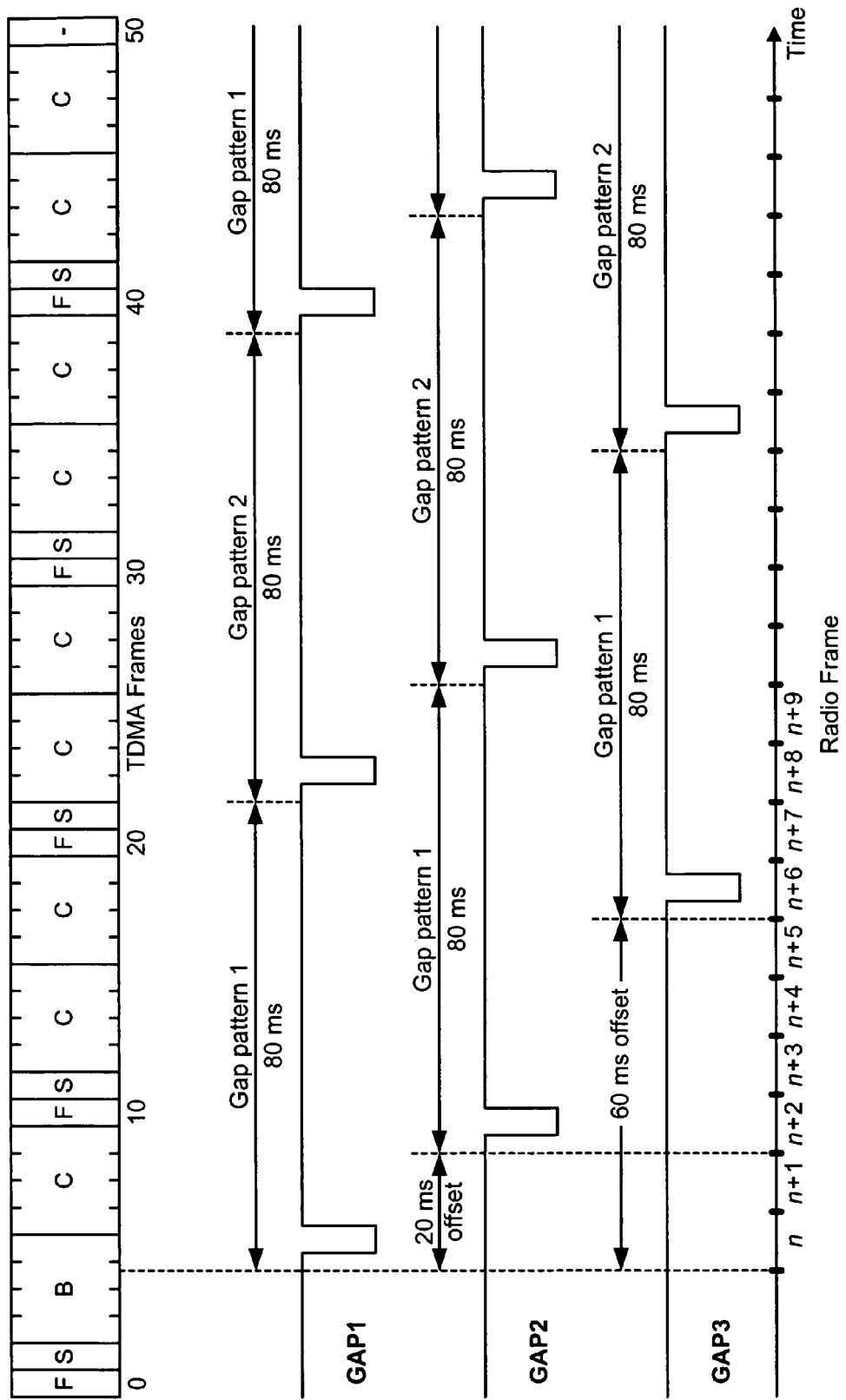
FIG. 7 shows three transmission gap pattern sequences for different purposes.

FIG. 7 shows an exemplary set of GAP1, GAP2 and GAP3 that may be provided to terminal 150. Table 1 lists the parameters for this exemplary set of GAP1, GAP2 and GAP3. In Table 1, transmission gap measurement purpose (TGMP) of 2, 3 and 4 correspond to GAP1, GAP2 and GAP3, respectively. Each GAP has an infinite duration, which is denoted by a value of 0 for TGPRC (not shown in Table 1). GAP1 starts at connection frame number (TGCFN) n, GAP2 starts at connection frame number n+2, and GAP3 starts at connection frame number n+6. In general, the TGCFN for each GAP is chosen in such that (1) transmission gaps from two different GAPs do not collide in a single radio frame and (2) no more than two radio frames out of any three consecutive radio frames are compressed.

Each GAP includes two transmission gap patterns. Each transmission gap pattern has a duration of 8 radio frames or 80 ms and includes one transmission gap that is 7 slots or 4.67 ms wide, which is slightly wider than one GSM frame of 4.615 ms. The second transmission gap in each transmission gap pattern is omitted by setting TGD to 270 slots. The transmission gaps for each GAP are thus spaced apart by 80 ms. The transmission gaps in GAP2 are delayed by 2 radio frames or 20 ms with respect to the transmission gaps in GAP1. The transmission gaps in GAP3 are delayed by 4 radio frames or 40 ms with respect to the transmission gaps in GAP2.

TABLE 1

| GAP | TGMP | TGPRC | TGCFN | TGSN (slot index) | TGL1 (slots) | TGL2 (slots) | TGD (slots) | TGPL1 (frames) | TGPL2 (frames) |
|---|---|---|---|---|---|---|---|---|---|
| GAP1 | 2 | infinite | n | 4 | 7 | — | 270 | 8 | 8 |
| GAP2 | 3 | infinite | n + 2 | 4 | 7 | — | 270 | 8 | 8 |
| GAP3 | 4 | infinite | n + 6 | 4 | 7 | — | 270 | 8 | 8 |

FIG. 7 and Table 1 show an exemplary set of GAP1, GAP2 and GAP3 that may be allocated for cell measurement. UMTS network 120 may also allocate GAPs having different parameter values than those given in Table 1.

FIG. 7 also shows an exemplary alignment of the transmission gaps in GAP1, GAP2 and GAP3 to the GSM frames in a 51-frame multiframe. Since the timing of UMTS cells may be asynchronous with respect to the timing of GSM cells, the transmission gaps in GAP1, GAP2 and GAP3 may overlap any of the GSM frames at any given moment.

Terminal 150 performs the three tasks in blocks 510, 520 and 530 in FIG. 5 in a sequential order when the terminal first receives the monitored list and the transmission gap pattern sequences from UMTS network 120. Each of the three tasks may be performed as described below.

Terminal 150 performs RSSI measurement in block 510 for all GSM cells in the monitored list and obtains a set of RSSI measurements for these GSM cells. Terminal 150 is required to take at least 3 RSSI samples for each GSM cell and to filter/average these RSSI samples to obtain an RSSI measurement for that GSM cell. Each RSSI sample is a power measurement for one RF channel of one GSM cell. The power measurement may be made in any GSM frame. Terminal 150 spaces the RSSI samples for each GSM cell as far apart in time as possible. This may be achieved, for example, by cycling through the GSM cells in the monitored list three times and taking one RSSI sample for each GSM cell in each cycle through the monitored list. Table 2 lists the minimum number of RSSI samples that terminal 150 is required to take in each transmission gap for different gap lengths.

TABLE 2

| Gap length TGL (slots) | Number of RSSI samples/gap |
|---|---|
| 3 | 1 |
| 4 | 2 |
| 5 | 3 |
| 7 | 6 |
| 10 | 10 |
| 14 | 15 |

The total time required to perform an RSSI scan is dependent on the number of GSM cells in the monitored list, the number of transmission gaps used for RSSI measurement, and the duration of each transmission gap used for RSSI measurement.

The number of radio frames needed for an RSSI scan may be computed as follows:

$$F_s = \left\lceil \frac{3 \cdot N_{cells}}{g(TGL1) + g(TGL2)} \right\rceil \times TGPL, \quad \text{Eq (1)}$$

where $N_{cells}$ is the number of GSM cells in the monitored list,
TGPL1 and TGPL1 are the lengths of transmission gaps 1 and 2, respectively,
g(TGL1) and g(TGL2) are the number of RSSI samples that may be obtained for transmission gaps 1 and 2, respectively,
$F_s$ is the number of radio frames required for an RSSI scan, and
$\lceil \ \rceil$ denotes a ceiling operator that provides the next higher integer value.

In equation (1), g(TGLi), for i=1, 2, is a function of TGLi and is given in Table 2. The number of GSM cells ($N_{cells}$) and the transmission gap duration (TGLi) are typically determined by UMTS network 120. The number of radio frames $F_s$ required to complete the RSSI scan is dependent on the number of transmission gaps used for RSSI measurement.

In an embodiment, to reduce the time required for an RSSI scan, terminal 150 takes RSSI samples for unique ARFCNs instead of each ARFCN of each GSM cell. Multiple GSM cells may be assigned the same ARFCN. An RSSI sample for an ARFCN contains the total received power for all GSM cells transmitting on that ARFCN. Terminal 150 typically makes no effort to determine how much each GSM cell contributes to the total received power. Hence, if multiple RSSI samples are obtained for multiple GSM cells transmitting on the same ARFCN, these RSSI samples are likely to be similar, with any differences being due to measurement errors and random fluctuation in received power.

Terminal 150 may form a measurement list that contains unique ARFCNs for all GSM cells in the monitored list. Terminal 150 may then take RSSI samples and obtain RSSI measurements for the ARFCNs in the measurement list. Each ARFCN of each GSM cell is then given the RSSI measurement for that ARFCN. The RSSI measurement for a given ARFCN in the measurement list may be given or attributed to one or multiple GSM cells.

After completing the RSSI measurements, terminal 150 ranks the RSSI measurements for all GSM cells in the monitored list and selects the eight strongest GSM cells. Terminal 150 then identifies the BSIC of each GSM cell. Terminal 150 typically performs BSIC identification for the eight strongest GSM cells in a sequential order, starting with the strongest GSM cell, then the next strongest GSM cell, and so on. For BSIC identification, terminal 150 gives priority to GSM cells whose BSIC is unknown, as described in 3GPP TS 25.133.

Terminal 150 may perform BSIC identification for a given GSM cell x in two steps. In step 1, terminal 150 detects for a tone sent by GSM cell x on the FCCH. In step 2, terminal 150 decodes the SCH burst sent by GSM cell x to obtain the BSIC for that GSM cell. As shown in FIGS. 3 and 7, the FCCH is sent in GSM frames 0, 10, 20, 30 and 40, and the SCH is sent in GSM frames 1, 11, 21, 31 and 41. Terminal 150 typically does not have any timing information for GSM cell x. Hence, terminal 150 typically performs tone detection for GSM cell x in each transmission gap available for BSIC identification until a tone is detected for GSM cell x. The tone detection provides terminal 150 with frequency and coarse timing information for GSM cell x. The coarse timing information allows terminal 150 to ascertain (to within one GSM frame) when the SCH for GSM cell x is transmitted. Terminal 150 may then decode the SCH for GSM cell x in the next transmission gap that aligns with the SCH.

For step 1, the first transmission gap used for tone detection may overlap any of the GSM frames in the 51-frame multi-frame, as shown in FIG. 7. If the first transmission gap happens to overlap the FCCH for GSM cell x, then terminal 150 can detect the tone for GSM cell x in one transmission gap. However, if the first transmission gap is not aligned with the FCCH for GSM cell x, then terminal 150 may require one or more additional transmission gaps in order to detect the tone on the FCCH.

In an embodiment, terminal 150 maintains a record of unsuccessful tone detection attempts. For each GSM cell in the BSIC_ID list, the record may indicate which GSM frames, if any, in which tone detection has been attempted and failed for that GSM cell. For each transmission gap that is available for tone detection, the GSM frame that overlaps that transmission gap is determined. The record is then checked to identity all GSM cells for which tone detection has previously failed in that GSM frame. The transmission gap may then be allocated to a GSM cell for which tone detection has not previously failed in this GSM frame. This way, tone detection is not attempted multiple times on the same GSM frame for a given GSM cell when that GSM frame has not been used for tone detection for another GSM cell.

Conventionally, terminal 150 uses only the transmission gaps in GAP1 for RSSI measurement, uses the transmission gaps in GAP2 only for BSIC identification, and uses the transmission gaps in GAP3 only for BSIC re-confirmation. In this case, terminal 150 may require a long time to complete the first RSSI scan using only GAP1. During this time, GAP2 and GAP3 are not used, and network resources are wasted. Terminal 150 may also require a long time to perform BSIC identification using only GAP2. During this time, GAP3 is not used and essentially wasted. It is desirable to identify at least one GSM cell and to send the first report to UMTS network 120 as quickly as possible in case terminal 150 needs to be handed over to GSM.

In many instances, terminal 150 is not handed over from UMTS to GSM right after sending the first report. Terminal 150 may continually perform RSSI measurement, BSIC identification, and BSIC re-confirmation in order to maintain an up-to-date list of candidate GSM cells for handover. Terminal 150 reports GSM cells to UMTS network 120 whenever reporting is triggered. For example, measurement reporting may be triggered by an event (for event triggered reporting), by expiration of a timer (for periodic reporting), and so on.

In an aspect, terminal 150 utilizes the allocated transmission gaps in an efficient manner to achieve good performance. Terminal 150 may utilize a transmission gap for its designated purpose or an alternate purpose. This may allow terminal 150 to quickly and efficiently identify good GSM cells for handover at any given moment.

Table 3 lists the three transmission gap pattern sequences GAP1, GAP2 and GAP3 for different purposes. For each GAP, Table 3 lists alternate uses for that GAP as well as exemplary criteria for using the GAP for the alternate purposes. The alternate uses for each GAP are described in detail below. In the following description, an RSSI gap is a transmission gap in GAP1, an identification gap is a transmission gap in GAP2, and a re-confirmation gap is a transmission gap in GAP3.

TABLE 3

| Assigned GAP | Alternate Use | Criteria |
| --- | --- | --- |
| GAP1 | BSIC ID | No cells have been identified and a new cell has been added for RSSI measurement. |
| | Re-confirmation | Not supported. |
| GAP2 | RSSI | Applicable for the first RSSI scan. |
| | Re-confirmation | An identified cell is stronger, not reconfirmed within $T_{rec}$ seconds, and falls in an identification gap. |
| GAP3 | RSSI | For the first RSSI scan. |
| | BSIC ID | No cells have been identified or no identified cell falls in a re-confirmation gap. |

In an embodiment, terminal 150 performs the first RSSI scan using all three GAP1, GAP2 and GAP3 to obtain an initial set of RSSI measurements for the GSM cells in a shorter amount of time. Terminal 150 is not able to use GAP2 and GAP3 for the designated purposes of BSIC identification and BSIC re-confirmation, respectively, until after the initial set of RSSI measurements has been obtained. Hence, terminal 150 may efficiently utilize GAP2 and GAP3 as well as GAP1 to complete the first RSSI scan in a shorter time period.

In an embodiment, after the first RSSI scan, terminal 150 performs BSIC identification using GAP2 and GAP3 or using all three GAP1, GAP2 and GAP3 to quickly identify at least one GSM cell. Terminal 150 is not able to use GAP3 for the designated purpose of BSIC reconfirmation until after at least one GSM cell has been identified. Hence, terminal 150 may efficiently utilize GAP3 (and possibly GAP1) as well as GAP2 to identify GSM cells in a shorter time period.

After at least one GSM cell has been identified, GAP1 should be used to make RSSI measurements to ensure that the strongest GSM cells are identified even as terminal 150 moves about the network. However, in certain instances, it is desirable to use GAP1 and/or GAP3 for BSIC identification. For example, if the monitored list has been updated with new GSM cells or if the reconfirmation list becomes empty, then it may be advantageous to use some or all of the RSSI gaps for BSIC identification. Furthermore, in some circumstances, it may be desirable to use GAP1 and/or GAP3 for BSIC identification.

Figure 8:
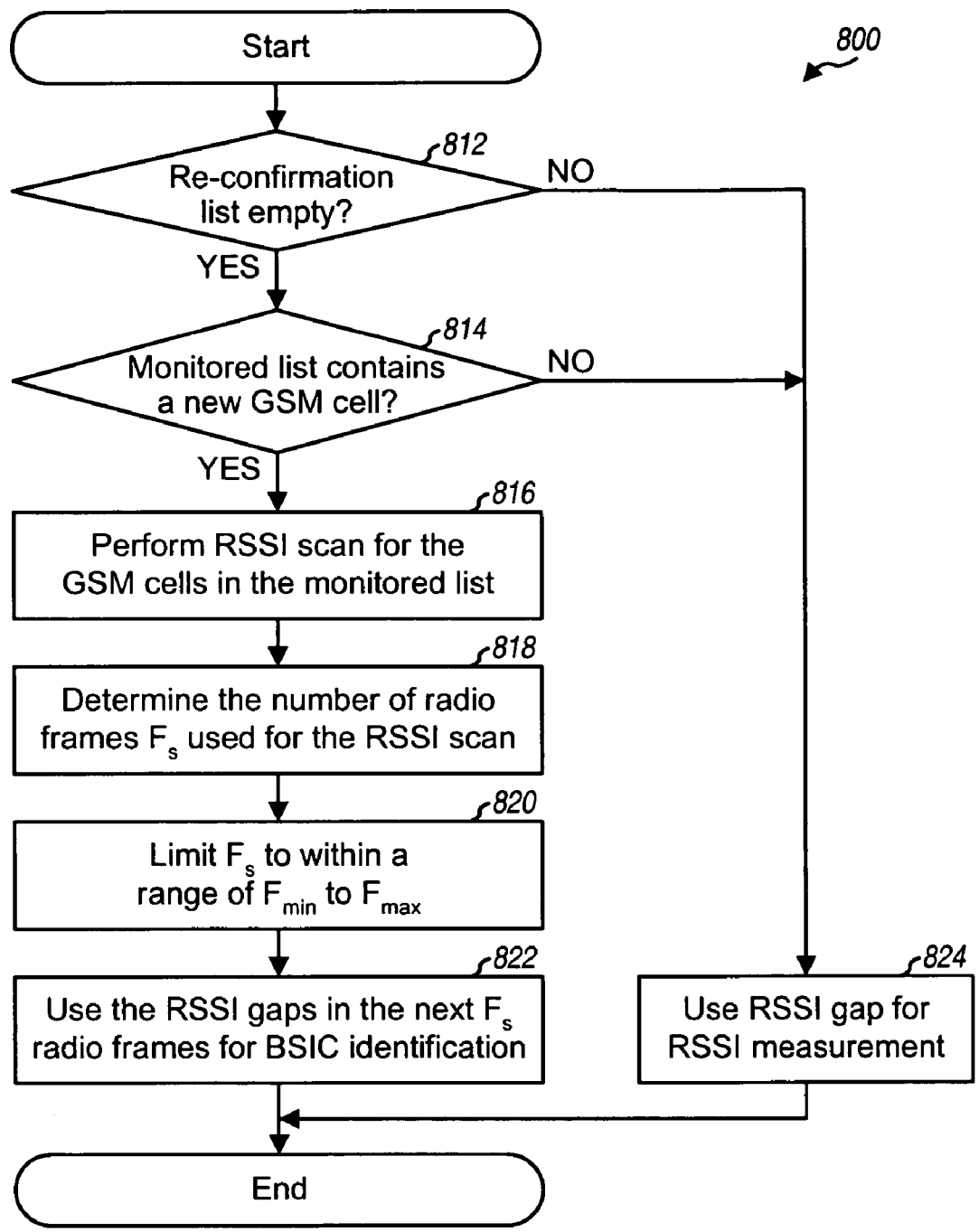
FIG. 8 shows a process for using RSSI gaps in GAP1.

FIG. 8 shows an embodiment of a process 800 for using RSSI gaps. In this embodiment, RSSI gaps are used for BSIC identification if the reconfirmation list is empty and at least one new GSM cell has been added to the monitored list.

A determination is made whether the reconfirmation list is empty (block 812). If the answer is 'No', which means that at least one GSM has been identified, then it may not be urgent to identify another GSM cell right away. In this case, the RSSI gap is used for RSSI measurement (block 824), and the process then terminates. If the re-confirmation list is empty, then a determination is made whether a new GSM cell has been added to the monitored list (block 814). The monitored list contains at least one new GSM cell when the list is first received from UMTS network 120 or if a new GSM cell is added via signaling from UMTS network 120. If the answer is 'No' for block 814, which means that BSIC identification has already been attempted for the GSM cells currently in the monitored list, then the RSSI gap is used for RSSI measurement (block 824), and the process then terminates.

If at least one new GSM cell has been added to the monitored list, then an RSSI scan is performed for all of the GSM cells in the monitored list (block 816). The number of radio frames $F_s$ used for the RSSI scan is determined, e.g., as shown in equation (1) (block 818). In an embodiment, RSSI gaps are used for BSIC identification after performing an RSSI scan with at least one new GSM cell. In an embodiment, the number of RSSI gaps to use for BSIC identification is equal to the number of RSSI gaps used for the RSSI scan but is limited to within a range of $F_{min}$ to $F_{max}$ (block 820). In an embodiment, $F_{min}$ is equal to 20 radio frames and $F_{max}$ is equal to 100 radio frames. $F_{min}$ and $F_{max}$ may also be set to other values. For block 820, $F_s$ may be set to $F_{max}$ if it is greater than $F_{max}$ and may be set to $F_{min}$ if it is less than $F_{min}$. The RSSI gaps in the next $F_s$ radio frames are then used for BSIC identification (block 822).

FIG. 8 shows a specific embodiment in which RSSI gaps are used for BSIC identification after completing an RSSI scan with at least one new GSM cell. RSSI gaps may also be used for BSIC identification based on some other criteria.

Figure 9:
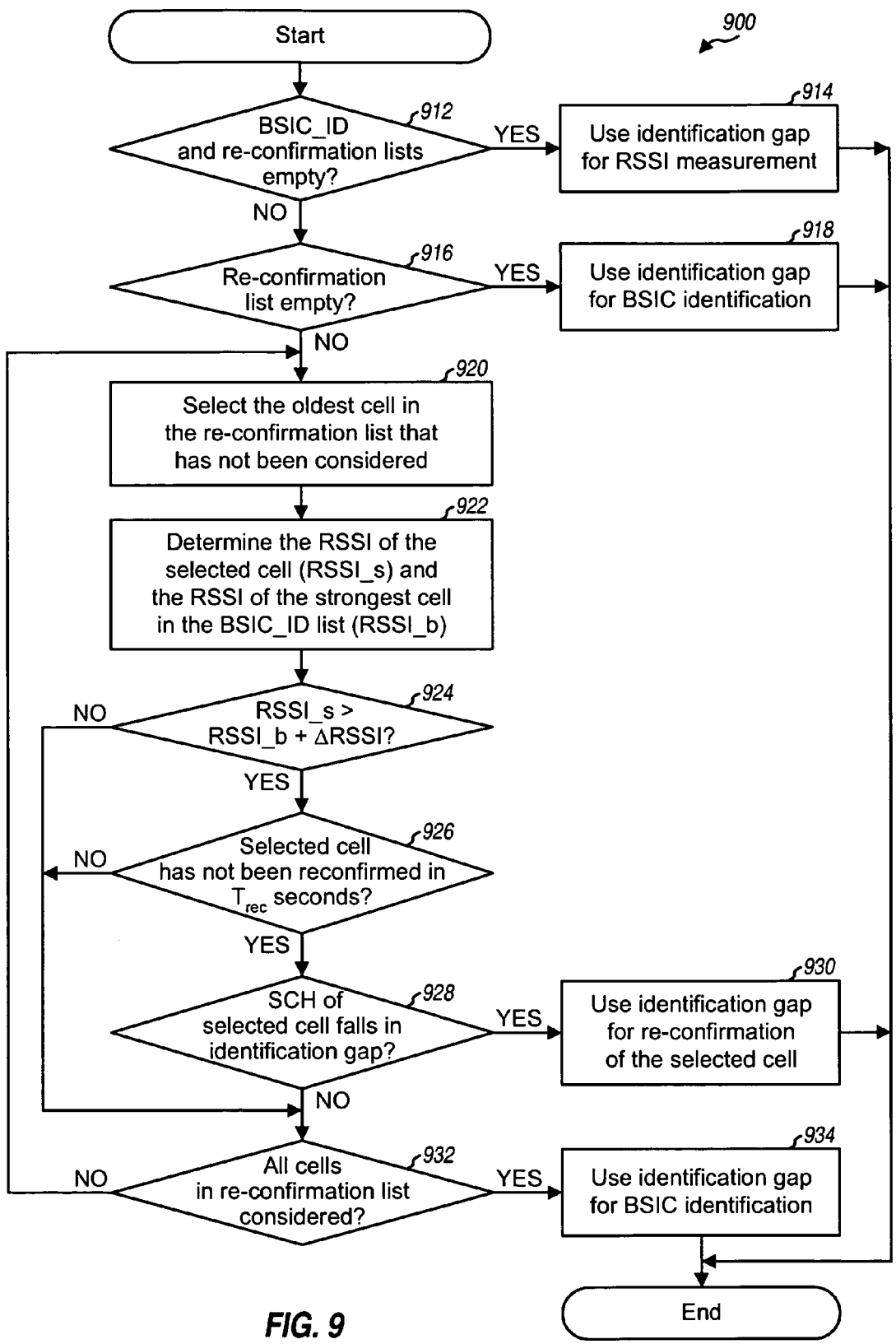
FIG. 9 shows a process for using identification gaps in GAP2.

FIG. 9 shows an embodiment of a process 900 for using identification gaps. Process 900 may be performed for each identification gap to determine whether to use that gap for RSSI measurement, BSIC identification, or BSIC re-confirmation.

A determination is made whether the BSIC_ID list and the re-confirmation list are both empty (block 912). If the answer is 'Yes', then the first RSSI scan has not been completed, the identification gap is used for RSSI measurement (block 914), and the process then terminates. If the answer is 'No' for block 912, then a determination is made whether the reconfirmation list is empty (block 916). If the answer is 'Yes' for block 916, then there are no GSM cells to reconfirm, the identification gap is used for BSIC identification (block 918), and the process then terminates. If the re-confirmation list is not empty, then the identification gap may be used for re-confirmation of a cell if applicable criteria are satisfied.

The oldest cell in the re-confirmation list that has not been considered is selected (block 920). The oldest cell is the cell that is reconfirmed the least recently. The RSSI of the selected cell (RSSI_s) and the RSSI of the strongest cell in the BSIC_ID list (RSSI_b) are determined (block 922). A determination is then made whether the RSSI of the selected cell exceeds the RSSI of the strongest unidentified cell by a delta RSSI, or whether RSSI_s>RSSI_b+ΔRSSI (block 924). ΔRSSI may be set to 3 decibel (dB) or some other value. If the answer is 'Yes' for block 924, then a determination is made whether the selected cell has not been reconfirmed within $T_{rec}$ seconds (block 926). $T_{rec}$ may be set equal to one half, three quarters, or some other fraction of the reconfirmation timeout period. If the answer is 'Yes' for block 926, then a determination is made whether the SCH for the selected cell falls in the identification gap (block 928). If the answer is 'Yes' for block 928, then the identification gap is used for BSIC re-confirmation of the selected cell (block 930).

If the answer is 'No' for any one of blocks 924, 926 and 928, then the selected cell is removed from consideration, and a determination is made whether all cells in the re-confirmation list have been considered (block 932). If the answer is 'No', then the process returns to block 920 to select the next oldest cell in the re-confirmation list for consideration. If all cells in the re-confirmation list have been considered and the identification gap is not used for any of these cells, then the gap is used for BSIC identification (block 934), and the process then terminates.

In the embodiment shown in FIG. 9, an identification gap is used for RSSI measurement if the first RSSI scan has not been completed. The identification gap is used for BSIC re-confirmation of an identified cell if its RSSI is sufficiently strong, it has not been reconfirmed recently, and its SCH falls in the identification gap. The identification gap may also be used for RSSI measurement or BSIC re-confirmation based on some other criteria.

Figure 10:
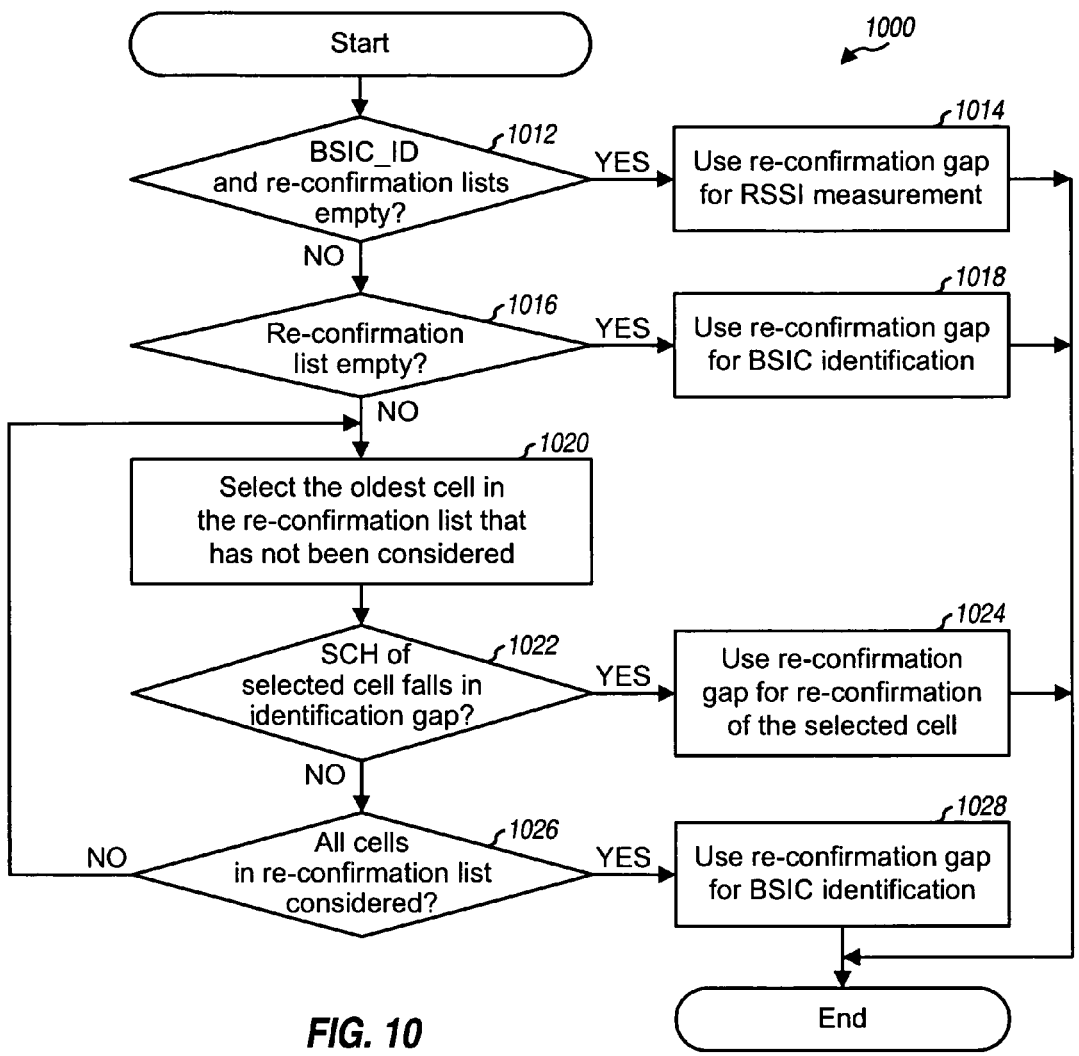
FIG. 10 shows a process for using re-confirmation gaps in GAP3.

FIG. 10 shows an embodiment of a process 1000 for using re-confirmation gaps. Process 1000 may be performed for each re-confirmation gap to determine whether to use that gap for RSSI measurement, BSIC identification, or BSIC re-confirmation.

A determination is made whether the BSIC_ID list and the reconfirmation list are both empty (block 1012). If the answer is 'Yes', then the first RSSI scan has not been completed, the re-confirmation gap is used for RSSI measurement (block 1014), and the process then terminates. If the answer is 'No' for block 1012, then a determination is made whether the re-confirmation list is empty (block 1016). If the answer is 'Yes' for block 1016, then there are no GSM cells to reconfirm, the re-confirmation gap may be used for BSIC identification (block 1018), and the process then terminates.

If the re-confirmation list is not empty, then the oldest cell in the re-confirmation list that has not been considered is selected (block 1020). A determination is made whether the SCH for the selected cell falls in the re-confirmation gap (block 1022). If the answer is 'Yes', then the re-confirmation gap is used for BSIC re-confirmation of the selected cell (block 1024), and the process then terminates. If the answer is 'No' for block 1022, then the selected cell is removed from consideration, and a determination is made whether all cells in the re-confirmation list have been considered (block 1026). If the answer is 'No', then the process returns to block 1020 to select the next oldest cell in the re-confirmation list for consideration. Otherwise, if all cells in the re-confirmation list have been considered and none of the cells in the list can use the re-confirmation gap, then the gap is used for BSIC identification (block 1028).

In the embodiment shown in FIG. 10, a re-confirmation gap is used for RSSI measurement if the first RSSI scan has not been completed. The re-confirmation gap is used for BSIC identification if the gap cannot be used for reconfirmation of any cell in the re-confirmation list. The re-confirmation gap may also be used for RSSI measurement or BSIC identification based on some other criteria. For example, a re-confirmation gap may be used for BSIC identification of an unidentified cell if that cell has a sufficiently strong RSSI and can use the gap.

Figure 11:
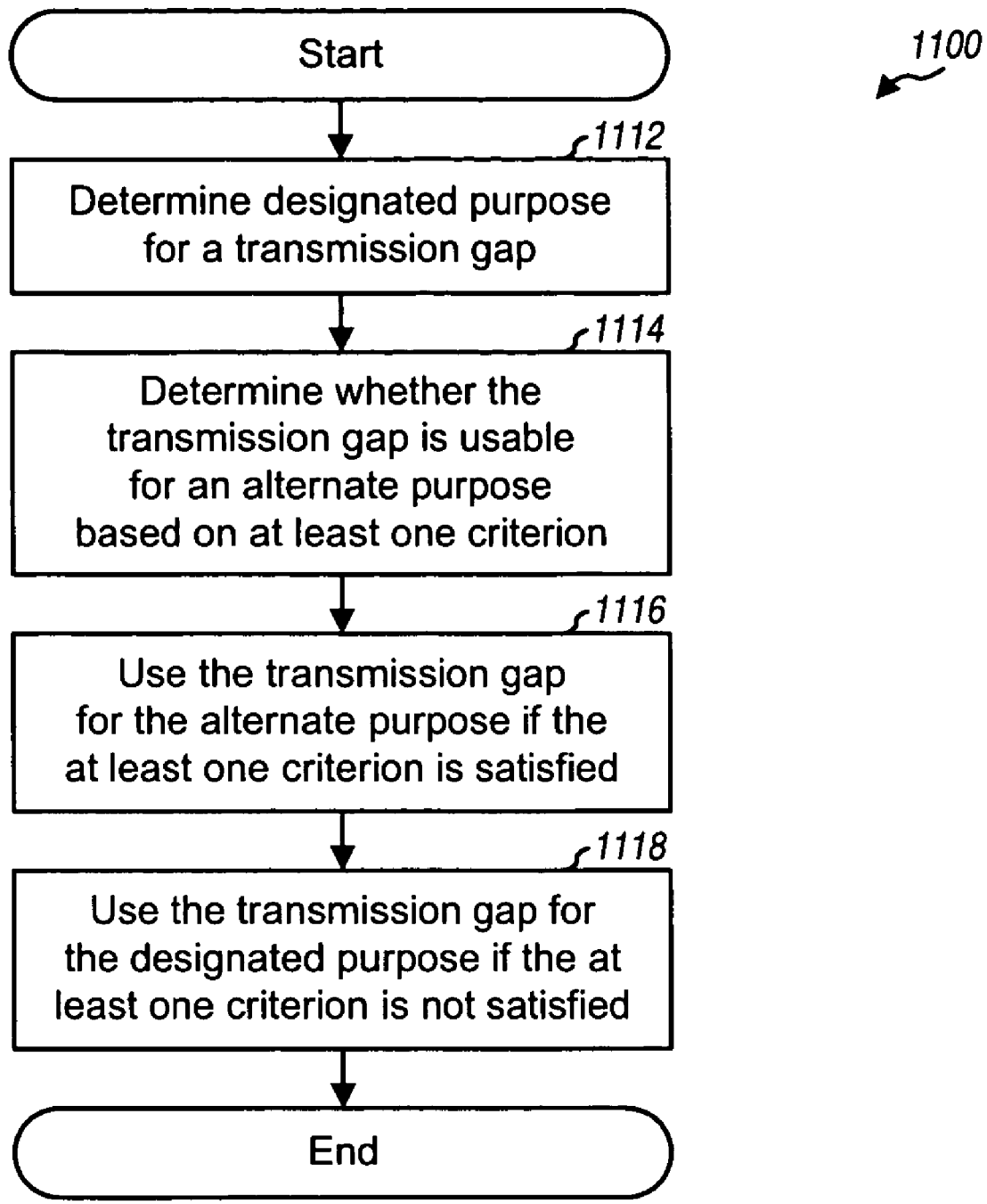
FIG. 11 shows a process for using transmission gaps efficiently.

FIG. 11 shows an embodiment of a process 1100 for using transmission gaps efficiently. Process 1100 may be performed for each transmission gap allocated to a terminal. The designated purpose for a transmission gap is determined (block 1112). Whether the transmission gap is usable for an alternate purpose is determined based on at least one criterion (block 1114).

The designated purpose for the transmission gap may be BSIC identification or BSIC re-confirmation, and the transmission gap may be used for RSSI measurement, e.g., if the first RSSI scan has not been completed and no cells are available for identification. The designated purpose may be BSIC re-confirmation, and the transmission gap may be used for BSIC identification, e.g., if no cells have been identified or if the transmission gap is not usable for re-confirmation of any identified cell in the re-confirmation list. The designated purpose may be RSSI measurement, and the transmission gap may be used for BSIC identification, e.g., if no cells have been identified and/or if RSSI measurements have been made for at least one new cell. The designated purpose may be BSIC identification, and the transmission gap may be used for BSIC re-confirmation, e.g., if an identified cell is sufficiently strong, has not been reconfirmed within a particular time period, and can be reconfirmed with the transmission gap. In general, the transmission gap may be used for an alternate purpose based on any criteria.

The transmission gap is used for the alternate purpose if the at least one criterion is satisfied (block 1116). The transmission gap is used for the designated purpose if the at least one criterion is not satisfied (block 1118).

Figure 12:
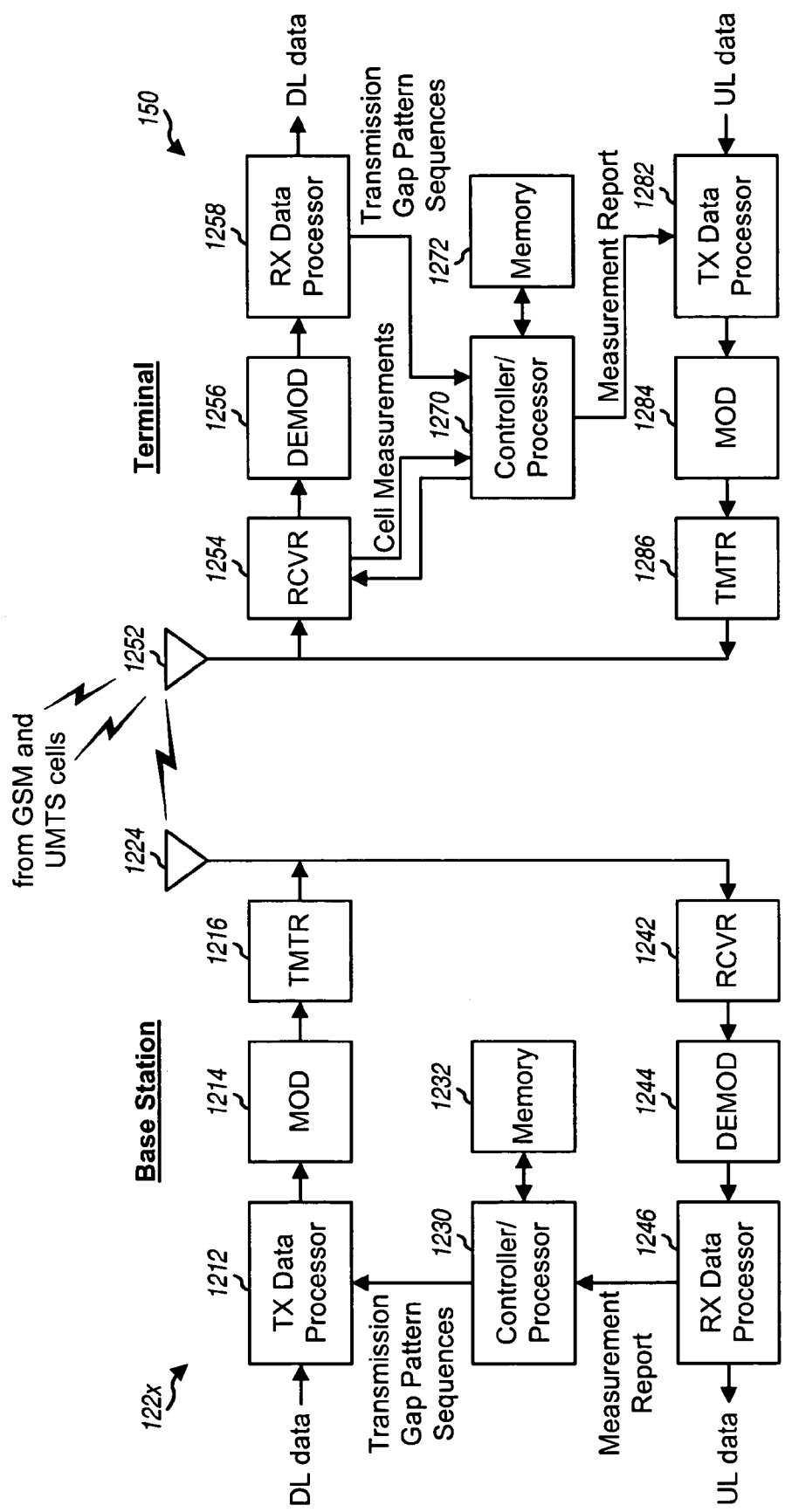
FIG. 12 shows a block diagram of a base station and a terminal.

FIG. 12 shows a block diagram of a base station 122x in UMTS network 120 and terminal 150. On the downlink, at base station 122x, a transmit (TX) data processor 1212 formats, encodes, and interleaves traffic data and signaling for terminal 150. A modulator (MOD) 1214 channelizes/spreads, scrambles, and modulates the output of TX data processor 1212 and provides a stream of chips. The processing of traffic data and signaling in UMTS is described in 3GPP TS 25-321, TS 25-308, TS 25-212, and other 3GPP documents. A transmitter (TMTR) 1216 conditions (e.g., converts to analog, amplifies, filters, and frequency upconverts) the stream of chips and generates a downlink signal, which is transmitted via an antenna 1224.

At terminal 150, an antenna 1252 receives the downlink signals from base station 122x and other base stations in the GSM and UMTS networks. Antenna 1252 provides a received signal to a receiver (RCVR) 1254. Receiver 1254 conditions (e.g., filters, amplifies, frequency downconverts, and digitizes) the received signal to obtain input samples. A demodulator (DEMOD) 1256 descrambles, dechannelizes/despreads, and demodulates the input samples and provides symbol estimates, which are estimates of the data symbols transmitted by base station 122x. A receive (RX) data processor 1258 deinterleaves and decodes the symbol estimates, checks the received packets, and provides decoded data. The processing by demodulator 1256 and RX data processor 1258 is complementary to the processing by modulator 1214 and TX data processor 1212, respectively.

On the uplink, traffic data and signaling are processed by a TX data processor 1282, further processed by a modulator 1284, conditioned by a transmitter 1286, and transmitted via antenna 1252. At base station 122x, the uplink signal is received by antenna 1224, conditioned by a receiver 1242, processed by a demodulator 1244, and further processed by an RX data processor 1246 to recover the uplink data and signaling.

Controllers/processors 1230 and 1270 control the operation at base station 122x and terminal 150, respectively. Memories 1232 and 1272 store data and program codes for base station 122x and terminal 150, respectively. Controller/processor 1270 may also implement process 800 in FIG. 8, process 900 in FIG. 9, process 1000 in FIG. 10, and/or process 1100 in FIG. 11. Controller/processor 1270 receives the monitored list and the transmission gap pattern sequences from UMTS network 120. Controller/processor 1270 directs receiver 1254 to make measurements for GSM cells at time intervals determined by the transmission gaps in the allocated transmission gap pattern sequences. These cell measurements may be for RSSI measurements, tone detection (for BSIC identification), and SCH decoding (for BSIC identification and re-confirmation). Upon completing the cell measurements and whenever a reporting event is triggered, controller/processor 1270 generates a measurement report and sends the report to UMTS network 120.

For clarity, the cell measurement techniques have been specifically described for GSM and UMTS networks. These techniques may also be used for other types of networks, which may implement other radio technologies.

The cell measurement techniques described herein may be implemented by various means. For example, these techniques may be implemented in hardware, firmware, software, or a combination thereof. For a hardware implementation, the processing units used to perform cell measurements may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 1272 in FIG. 12) and executed by a processor (e.g., processor 1270). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to determine a designated purpose for a transmission gap, to determine whether the transmission gap is usable for an alternate purpose based on at least one criterion, and to use the transmission gap for the alternate purpose if the at least one criterion is satisfied; and
    a memory coupled to the at least one processor;
    wherein the designated purpose for the transmission gap is base transceiver station identity code (BSIC) identification or BSIC re-confirmation, and wherein the at least one processor is configured to determine whether the transmission gap is usable for received signal strength indicator (RSSI) measurement.

2. The apparatus of claim 1, wherein the at least one processor is configured to use the transmission gap for the designated purpose if the at least one criterion is not satisfied.

3. The apparatus of claim 1, wherein the transmission gap is usable for RSSI measurement if an RSSI scan has not been completed and no cells are available for identification.

4. An apparatus, comprising:
    at least one processor configured to determine a designated purpose for a transmission gap, to determine whether the transmission gap is usable for an alternate purpose based on at least one criterion, and to use the transmission gap for the alternate purpose if the at least one criterion is satisfied; and
    a memory coupled to the at least one processor;

wherein the designated purpose for the transmission gap is received signal strength indicator (RSSI) measurement, and wherein the at least one processor is configured to determine whether the transmission gap is usable for base transceiver station identity code (BSIC) identification.

5. The apparatus of claim 4, wherein the transmission gap is usable for BSIC identification if no cells have been identified.

6. The apparatus of claim 4, wherein the transmission gap is usable for BSIC identification if no cells have been identified and RSSI measurements have been made for at least one new cell.

7. The apparatus of claim 4, wherein the at least one processor is configured to use the transmission gap for the designated purpose if the at least one criterion is not satisfied.

8. An apparatus, comprising:
at least one processor configured to determine a designated purpose for a transmission gap, to determine whether the transmission gap is usable for an alternate purpose based on at least one criterion, and to use the transmission gap for the alternate purpose if the at least one criterion is satisfied; and
a memory coupled to the at least one processor;
wherein the designated purpose for the transmission gap is base transceiver station identity code (BSIC) identification, and wherein the at least one processor is configured to determine whether the transmission gap is usable for BSIC re-confirmation.

9. The apparatus of claim 8, wherein the at least one processor is configured to select one identified cell at a time, starting with an identified cell that is reconfirmed least recently, and to use the transmission gap for BSIC re-confirmation of the selected cell if the selected cell meets the at least one criterion.

10. The apparatus of claim 8, wherein the transmission gap is usable for BSIC re-confirmation if an identified cell has sufficient signal strength and has not been reconfirmed within a predetermined time period.

11. The apparatus of claim 8, wherein the at least one processor is configured to use the transmission gap for the designated purpose if the at least one criterion is not satisfied.

12. An apparatus, comprising:
at least one processor configured to determine a designated purpose for a transmission gap, to determine whether the transmission gap is usable for an alternate purpose based on at least one criterion, and to use the transmission gap for the alternate purpose if the at least one criterion is satisfied; and
a memory coupled to the at least one processor;
wherein the designated purpose for the transmission gap is base transceiver station identity code (BSIC) re-confirmation, and wherein the at least one processor is configured to determine whether the transmission gap is usable for BSIC identification.

13. The apparatus of claim 12, wherein the transmission gap is usable for BSIC identification if not usable for re-confirmation of any identified cell.

14. The apparatus of claim 12, wherein the at least one processor is configured to use the transmission gap for the designated purpose if the at least one criterion is not satisfied.

15. A method, comprising:
determining, by at least one processor, a designated purpose for a transmission gap;
determining whether the transmission gap is usable for an alternate purpose based on at least one criterion; and
using the transmission gap for the alternate purpose if the at least one criterion is satisfied;
wherein the determining whether the transmission gap is usable for an alternate purpose comprises:
identifying the designated purpose for the transmission gap as being for base transceiver station identity code (BSIC) identification or BSIC re-confirmation, and
determining whether the transmission gap is usable for received signal strength indicator (RSSI) measurement based on whether an RSSI scan has been completed, whether any cells are available for identification, or a combination thereof.

16. The method of claim 15, further comprising using the transmission gap for the designated purpose if the at least one criterion is not satisfied.

17. A method, comprising:
determining, by at least one processor, a designated purpose for a transmission gap;
determining whether the transmission gap is usable for an alternate purpose based on at least one criterion; and
using the transmission gap for the alternate purpose if the at least one criterion is satisfied;
wherein the determining whether the transmission gap is usable for an alternate purpose comprises:
identifying the designated purpose for the transmission gap as being for received signal strength indicator (RSSI) measurement, and
determining whether the transmission gap is usable for base transceiver station identity code (BSIC) identification based on whether any cells have been identified, whether RSSI measurements have been made for at least one new cell, or a combination thereof.

18. The method of claim 17, further comprising using the transmission gap for the designated purpose if the at least one criterion is not satisfied.

19. A method, comprising:
determining, by at least one processor, a designated purpose for a transmission gap;
determining whether the transmission gap is usable for an alternate purpose based on at least one criterion; and
using the transmission gap for the alternate purpose if the at least one criterion is satisfied;
wherein the determining whether the transmission gap is usable for an alternate purpose comprises:
identifying the designated purpose for the transmission gap as being for base transceiver station identity code (BSIC) identification, and
determining whether the transmission gap is usable for BSIC re-confirmation based on whether an identified cell has sufficient signal strength, whether the identified cell has not been reconfirmed within a predetermined time period, or a combination thereof.

20. The method of claim 19, further comprising using the transmission gap for the designated purpose if the at least one criterion is not satisfied.

21. A method, comprising:
determining, by at least one processor, a designated purpose for a transmission gap;
determining whether the transmission gap is usable for an alternate purpose based on at least one criterion; and
using the transmission gap for the alternate purpose if the at least one criterion is satisfied;
wherein the determining whether the transmission gap is usable for an alternate purpose comprises:
identifying the designated purpose for the transmission gap as being for base transceiver station identity code (BSIC) re-confirmation, and determining whether the transmission gap is usable for BSIC identification based on whether any cell has been identified, whether the transmission gap is usable for re-confirmation of any identified cell, or a combination thereof.

22. The method of claim 21, further comprising using the transmission gap for the designated purpose if the at least one criterion is not satisfied.

23. An apparatus, comprising:
   means for determining a designated purpose for a transmission gap;
   means for determining whether the transmission gap is usable for an alternate purpose based on at least one criterion; and
   means for using the transmission gap for the alternate purpose if the at least one criterion is satisfied;
   wherein the means for determining whether the transmission gap is usable for an alternate purpose comprises:
      means for identifying the designated purpose for the transmission gap as being for base transceiver station identity code (BSIC) identification or BSIC re-confirmation, and
      means for determining whether the transmission gap is usable for received signal strength indicator (RSSI) measurement based on whether an RSSI scan has been completed, whether any cells are available for identification, or a combination thereof.

24. The apparatus of claim 23, further comprising means for using the transmission gap for the designated purpose if the at least one criterion is not satisfied.

25. An apparatus, comprising:
   means for determining a designated purpose for a transmission gap;
   means for determining whether the transmission gap is usable for an alternate purpose based on at least one criterion; and
   means for using the transmission gap for the alternate purpose if the at least one criterion is satisfied;
   wherein the means for determining whether the transmission gap is usable for an alternate purpose comprises:
      means for identifying the designated purpose for the transmission gap as being for base transceiver station identity code (BSIC) re-confirmation, and
      means for determining whether the transmission gap is usable for BSIC identification based on whether any cell has been identified, whether the transmission gap is usable for re-confirmation of any identified cell, or a combination thereof.

26. The apparatus of claim 25, further comprising means for using the transmission gap for the designated purpose if the at least one criterion is not satisfied.

27. A non-transitory processor readable media for storing instructions operable in a wireless device to:
   determine, via execution by at least one processor, a designated purpose for a transmission gap;
   determine whether the transmission gap is usable for an alternate purpose based on at least one criterion;
   use the transmission gap for the alternate purpose if the at least one criterion is satisfied;
   identify the designated purpose for the transmission gap as being for base transceiver station identity code (BSIC) identification or BSIC re-confirmation; and
   determine whether the transmission gap is usable for received signal strength indicator (RSSI) measurement based on whether an RSSI scan has been completed, whether any cells are available for identification, or a combination thereof.

28. The non-transitory processor readable media of claim 27, and further for storing instructions operable to use the transmission gap for the designated purpose if the at least one criterion is not satisfied.

29. A non-transitory processor readable media for storing instructions operable in a wireless device to:
   determine, via execution by at least one processor, a designated purpose for a transmission gap;
   determine whether the transmission gap is usable for an alternate purpose based on at least one criterion;
   use the transmission gap for the alternate purpose if the at least one criterion is satisfied;
   identify the designated purpose for the transmission gap as being for base transceiver station identity code (BSIC) re-confirmation; and
   determine whether the transmission gap is usable for BSIC identification based on whether any cell has been identified, whether the transmission gap is usable for re-confirmation of any identified cell, or a combination thereof.

30. The non-transitory processor readable media of claim 29, and further for storing instructions operable to use the transmission gap for the designated purpose if the at least one criterion is not satisfied.

* * * * *